United States Patent [19]
van Zeggelaar

[11] 3,740,533
[45] June 19, 1973

[54] METHOD OF CONTROLLING A PROCESS AND APPARATUS FOR THE PERFORMANCE OF THE METHOD

[75] Inventor: Gerrit Hendrik van Zeggelaar, Utrecht, Netherlands

[73] Assignee: Ballast-Nedam Groep N. V., Amsterdam, Netherlands

[22] Filed: Jan. 19, 1971

[21] Appl. No.: 107,716

[30] Foreign Application Priority Data
Jan. 23, 1970 Netherlands.................... 7001014

[52] U.S. Cl. ............................... 235/151.3, 73/4 R
[51] Int. Cl. ............................................ G01d 18/00
[58] Field of Search.................... 235/151.3; 73/4 R

[56] References Cited
UNITED STATES PATENTS
3,584,203   6/1971   Patzelt et al. ................. 235/151.3 X Primary Examiner—Malcolm A. Morrison
Assistant Examiner—R. Stephen Dildine, Jr.
Attorney—Snyder and Butrum

[57] ABSTRACT

A method and apparatus for controlling a process, which requires a control signal which varies linearly with a process variable, by means of an instrumentality which measures the variable but does not produce the required linear output. The deviation of the instrumentality from the desired linear signal is compensated for by calibrating the instrumentality for a number of values of the variable between which successive pairs thereof the output of the instrumentality is reasonably linear. Thus, between each pair $P_n$ and $P_{n-1}$ of the variable the ideal control signal is uniquely defined as $Y=mx+b$ where $x$ is the variable P, the slope $m$ equals $(Y_n-Y_{n-1})/(P_n-P_{n-1})$ and $b$ equals $Y_{n-1}$, with $Y_n$ and $Y_{n-1}$ being the ideal values corresponding to the values $P_n$ and $P_{n-1}$ of the variable; whereas the output of the instrumentality is at least closely defined as $S=m^1x+b^1$ where $x$ is again the variable P, the slope $m^1$ equals $(W_n-W_{n-1})/(P_n-P_{n-1})$ and $b^1$ equals $W_{n-1}$ with $W_n$ and $W_{n-1}$ being the calibrated outputs of the instrumentality corresponding to the values $P_n$ and $P_{n-1}$ of the variable. With these conditions prevailing for that range of the variable between each pair, the instrumentality output is corrected to equal $(S-W_{n-1})[(Y_n-Y_{n-1})/(W_n-W_{n-1})]+Y_{n-1}$ and is used to control the process with high degree of accuracy.

6 Claims, 5 Drawing Figures

INVENTOR
GERRIT HENDRIK VAN ZEGGELAAR

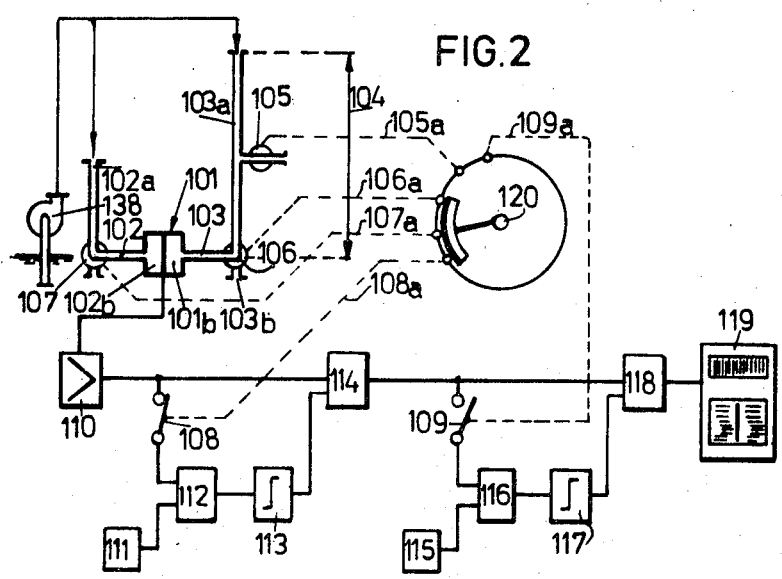
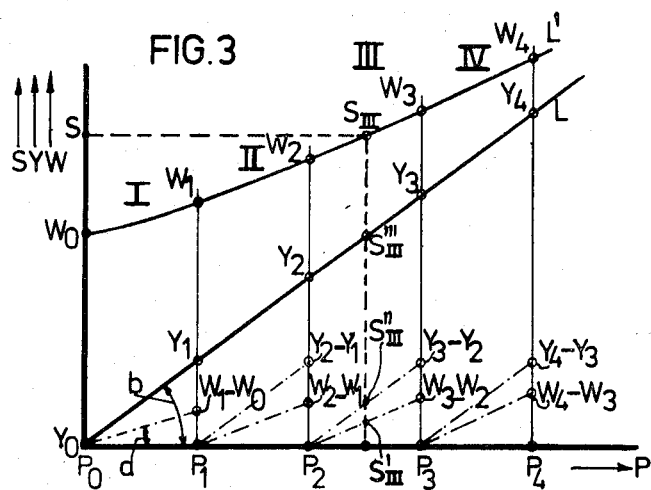

INVENTOR

GERRIT HENDRIK VAN ZEGGELAAR

METHOD OF CONTROLLING A PROCESS AND APPARATUS FOR THE PERFORMANCE OF THE METHOD the invention relates to a method of controlling a process, in which at least one pick-up with an electric output signal is used, after amplification by means of an amplifier, for the control of the process, and in which a measuring cycle is performed comprising at least one measurement preceded by at least one calibration, during which calibration the pick-up is subjected to a calibration state to produce an initial calibration signal, and during which measurement the pick-up is subjected to a measuring state to produce a measuring signal.

A method of the kind specified is known which, however, is not aimed at calibrating the deflection value, but merely performs right/wrong calibration.

A measuring method is also known using pick-ups with an electric output signal amplified by an amplifier for the control of a process, but without calibration. Such measurement is accurate enough for many kinds of processes, but the disadvantage is that the pick-ups must be of very high quality to ensure linear reading, while the quality of the amplifier is so important that there can be no limits to the demands made on it. If the deflection of a sensing member in a pick-up gives a voltage of 0.001 volts, and as a result a counter is required to jump two digits, requiring a control voltage of 2 volts, the amplifier must also have an amplification factor of exactly 2,000 and show no deviations, since otherwise the measurement is completely falsified.

Consequently, a very expensive apparatus is required which must be very quickly replaced if faults occur, more particularly since adjustment of the apparatus is very easily upset by jolts and impacts occurring during the heavy operation, for instance dredging operation.

It is an object of the invention to provide an improved method of the kind specified by using highly accurate measuring results from commercially available amplifiers and pick-ups.

To this end the method according to the invention is characterized in that the measuring cycle comprises at least two calibrations at different calibration states and the reference signal relating to the measurement is obtained by producing the signal difference between the measuring signal and the one calibration signal of the one of the two calibrations, which signal difference is multiplied by the reference signal difference associated with the state difference, the reference signal difference being divided by the calibration signal difference of the two calibrations, and the result is algebraically added to the one reference calibration signal associated with the one calibration state.

This method is effective even with relatively large deviations both of pick-up linearity and amplification. The cycle lasts for such a short time that the amplified output signal is substantially constant during each cycle.

However, two calibrations can be performed per cycle if an accurate enough pick-up is used which is substantially linear within the measuring range.

In another preferred embodiment of the method according to the invention the amplified calibration signal of the pick-up is determined with a gradually varying calibration state over the measuring range.

These and other features of the invention will now be described in detail with reference to the drawings which illustrate by way of example the control of a dredging process using pressure measurement, and wherein:

FIG. 2 is a simplified circuit;

FIG. 3 shows in graph form a further development of the method according to the invention;

For the better understanding of the method, FIG. 3 will be discussed first.

The aim is to reproduce linearly pressure differences in relation to atmosphere which actually follow a linear course during the dredging process. The values reproduced are used for influencing the dredging process.

In FIG. 3 pressures P loading a pressure pick-up 1 are plotted on the X-axis and amplified output signals S, W of the pressure pick-up and reference signals Y associated with the pressures P are plotted on the Y-axis.

If there were no deviations in the pressure pick-up and the amplifier, the amplified output signals of the pressure pick-up 1 would lie along a line L. However, since in fact the pressure pick-ups are as a rule loaded one-sidedly, a "0" shift occurs. Also their linearities are not exact. The amplified output signals W and S lie on line L'. To make the readings approximate to reality as closely as possible, the pressure pick-up is loaded by four calibration pressures $P_1 - P_4$ which ought to reproduce the values $Y_1 - Y_4$ on a reading scale, but in fact reproduce the values $W_1 - W_4$. At $P_o$ an amplified output signal $W_o$ occurs which must be deducted from the amplified output signal in measuring range I. A second correction must then be made to obtain a reliable reading within the measuring range I, since at the pressure $P_1$ the amplified output signal $= W_1$, instead of $Y_1$. To bring the points of the Line $Y_o$ to $(W_1-W_o)$ — (which line can be written as $y = x \tan a$) — to the correct points on the line L — (which line can be written as $y = x \tan b$) — the line $y = x \tan a$ must be multiplied by $$\frac{\tan b}{\tan a} = \frac{\frac{Y_1-Y_o}{P_1-P_o}}{\frac{W_1-W_o}{P_1-P_o}} = \frac{Y_1-Y_o}{W_1-W_o}$$

In the measuring range I the measured values must therefore be multiplied by $(Y_1 - Y_o)/(W_1 - W_o)$ whereafter $Y_o$ must again be added. Since in this case $Y_o = 0$, this is simple.

The correction is determined in a similar manner in the measuring range II. As stated hereinbefore, at the pressure $P_1$ the amplified output signal $= W_1$, instead of $Y_1$. This means an addition correction of $-W_1$. The amplifier correction and the deviation from the pick-up linearity correction are obtained by multiplying by $(Y_2 - Y_1)/(W_2 - W_1)$. The vertical displacement by $Y_1$ must then be corrected by the addition of $Y_1$. If the measuring output signal S falls in a measuring range $n$, the correction formula can be written as follows:

$$S'''_{(n)} = (S_{(n)} - W_{(n-1)}) \left( \frac{Y_n - Y_{(n-1)}}{W_n - W_{(n-1)}} \right) + Y_{(n-1)}$$

On the graph the measuring signal $S$ has a value belonging in measuring range III. By the correction formula this therefore becomes $S_{III}$.

$$(S_{III} - W_2) \to S_{III}$$
$$S_{III} - W_2)(Y_3 - Y_2)/(W_3 - W_2) \to S''_{III}$$
$$(S_{III} - W_2)(Y_3 - Y_2)/(W_3 - W_2) + Y_2 \to S'''_{III},$$

which is the corrected value of the measuring signal.

Figure 1:
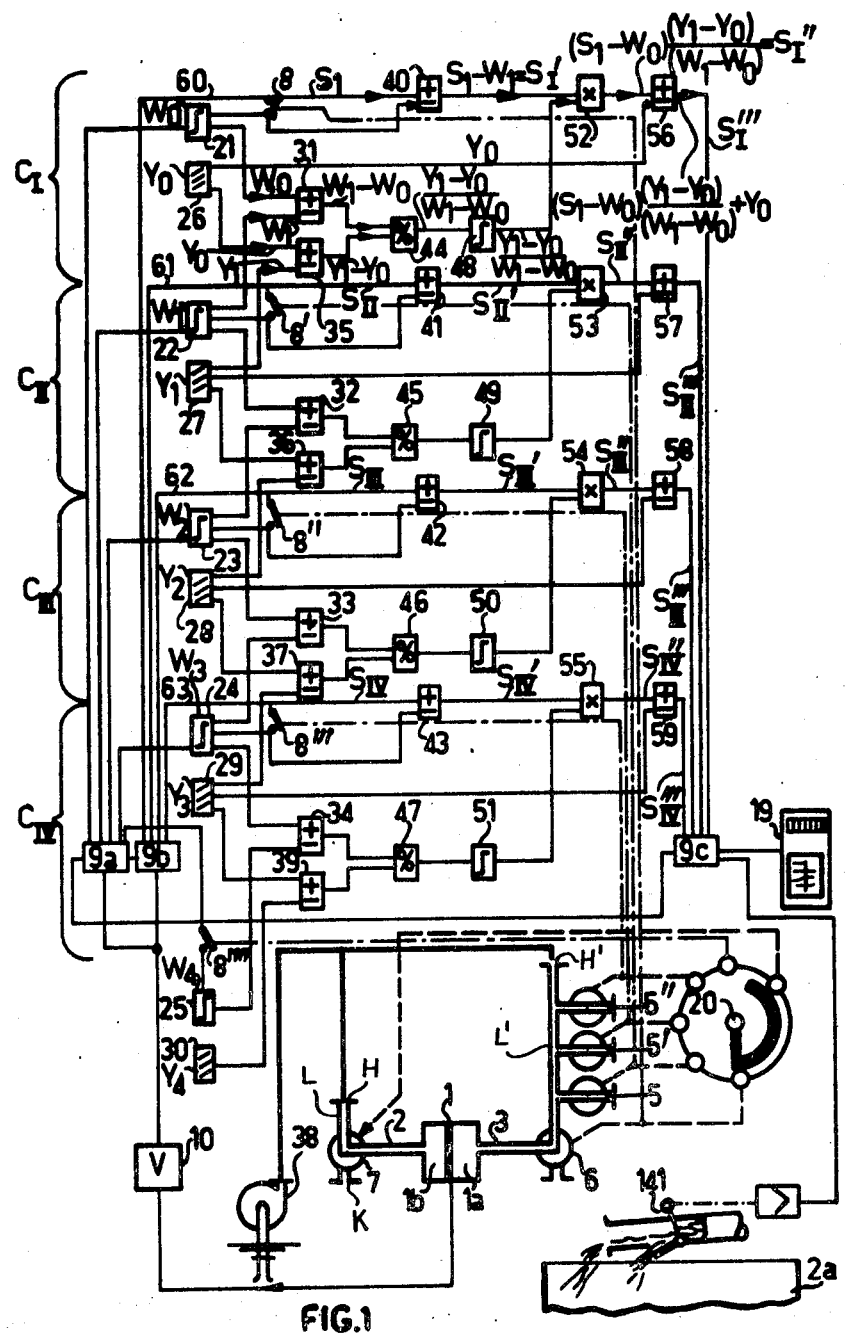
FIG. 1 is an exemplary circuit diagram for the performance of a method according to the invention.

The foregoing explanation makes it simple to follow the circuit shown in FIG. 1 in detail. In the embodiment illustrated the pressure pick-up 1 comprises two measuring chambers 1a, 1b having therebetween a deformable measuring diaphragm whose deformation produces an electric signal. To correct deviations in the output signal a starting position is first calibrated by subjecting the measuring chambers 1a, 1b to identical pressure by opening a valve 5 and moving three-way valves 6, 7 into the position shown via lines 2, 3, which are filled by a pump 38. it will be noted that the leg L terminates at a predetermined height as indicated at the point H whereas the right-hand leg L' terminates at a much higher point H' and that the several valves 5, 5' and 5'' are located at successively greater heights with respect to the leg L'. With the valve 5 open (valves 6 and 7 in the FIG. 1 position) the height of the column of liquid supplied by the pump 38 will be equal in the two legs L and L'; with the valve 5 closed and the valve 5' open, the height of the column in the right-hand Leg L' will be greater than in the left-hand leg L thereby establishing the pressure $P_1$; with the valves 5 and 5' closed and the valve 5'' open, the height of the column in the leg L' is still higher establishing the pressure $P_2$; and with all of the valves 5, 5' and 5'' closed, the height of the column in the leg L' is at the point H' establishing the pressure $P_3$. The pressure $P_4$ is established by maintaining all of the valves 5, 5' and 5'' closed while manipulating the valve 7 to such position as establishes connection between the chamber 1b and the outlet K, thereby effectively reducing the pressure in the chamber 1b and the height of the vertical leg L. A switch drum 20 has at the same time closed a switch 8, while simultaneously emptying stores 21, 48. The output signal then delivered by the pressure pick-up 1 is amplified by an amplifier 10 and the amplified output signal then has the errors of the pressure pick-up 1 during this calibration.

This signal is stored as $W_o$ in the store 21. The reference value $Y_o$ associated with this position has already been stored in store 26. The switch drum 20 then continues to rotate and applies to the measuring chamber 1a a calibration pressure $P_1$ which is associated with valve 5' and whose reference calibration signal $Y_1$ is stored in store 27. The output signal delivered by the pressure pick-up 1 then passes via amplifier 10 and selector switch 9a to store 22 previously emptied on operation of switch 8'. The switch drum 20 similarly supplies stores 23–25 via switches 8'', 8''', references having already been stored in stores 28–30. A measuring signal S in the first measuring range I is directed by a selector switch 9 via connection 60 to a corrector $C_I$ for the first measuring zone I. In a subtractor 40 the signal $S_1$ is algebraically reduced by a signal $W_o$ delivered by a store 21. The output signal of the subtractor is $S_1 - W_o$. In the meantime $(W_1 - W_o)$ is determined in the subtractor 31 by the successive subtraction of the signals $W_o$ and $W_1$ arriving from the stores 21 and 22, while $(Y_1 - Y_o)$ is calculated in subtractor 35 by the subtraction of the signals arriving from stores 26 and 27.

Division in a divider 44 produces $(Y_1 - Y_o)/(W_1 - W_o)$, which value is stored in the store 48. In the period between two calibrations, stores 21 and 48 continuously deliver these calculation signals to subtractor 40 and a multiplier 52 respectively. At the output of the multiplier 52 the measuring signal $S'_I$ has in the meantime acquired the value: $S'_I = (S_1 - W_o)(Y_1 - Y_o)/(W_1 - W_o)$. The algebraic addition in an adder 56 of the value $Y_o$ produces the corrected measuring signal $S'''_I = (S_1 - W_o)[(Y_1 - Y_o)/(W_1 - W_o)] + Y_o$.

This measuring signal is sent via selector switch 9c to processing and indicating device 19. Similarly, the signals $W_1$, $W_2$ and $W_3$ are subtracted from measuring signals $S_{II}$, $S_{III}$ and $S_{IV}$ in subtractors 41, 42 and 43, and 50 the agency of subtractors 32, 36, 33, 37, 34 and 39, dividers 45, 46 and 47 and stores 49 50 and 51 the partially corrected measuring signals $S'_{II}$, $S'_{III}$ and $S'_{IV}$ are multiplied at 53, 54 and 55 by $(Y_2 - Y_1)/(W_2 - W_1)$, $(Y_3 - Y_2)/(W_3 - W_2)$ and $(Y_4 - Y_3)/(W_4 - W_3)$ respectively, while the reference values $Y_1$, $Y_2$ and $Y_3$ are added at 57, 58 and 59. By making these corrections the actual value is very closely approximated, irrespective of the use of relatively simple amplifiers and pick-ups, so that substantially laboratory accuracy can be achieved in rough conditions, such as dredging.

The corrected measuring signal can be used for controlling the dredging process, for instance, for adjusting the loading valves 141 of a dredging process adapted to the loading of a space 2a, as disclosed in U.S. application Ser. No. 7,012, filed Jan. 30, 1970, and corresponding to Dutch Pat. application No. 69.01673.

FIG. 2 is a simplified circuit diagram. It is assumed that over the total measuring range the pressure pick-up 101 has a small enough deviation in linearity to be permissible for the observations. FIG. 2 shows a pressure pick-up 101 comprising two chambers in this embodiment. The two chambers 101a, 101b are connected to pressure lines 102, 103 which can be connected via three-way valves 107, 106 to measuring lines 102b and/or 103b or to calibration lines 102a, 103a. A pump 138 ensures that the calibration lines 102a, 103a always overflow, so that the levels remain constant. For the "0" calibration use is made of the calibration lines 102a, 103a, a valve 105 being placed in the position illustrated. An identical pressure is then applied to the two chambers 101a, 101b of the pressure pick-up 101, the three-way valves 106, 107 also being placed in the position illustrated, so that the indication must also be 0. If the pressure pick-up 101 then nevertheless delivers a signal, the signal passes via amplifier 110 and closed distributing switch 108 to subtractor 112 which subtracts such signal from the reference signal from the store 111 — i.e., in this case, therefore, 0. The result is transferred to store 113 which continues to deliver the signal to subtractor 114 until the next calibration. The distributing switch 108 is then re-opened, when the distributing switch 108 is next operated, the store 113 is simultaneously emptied.

The closure of the valve 105 and if necessary the change-over of the three-way valve 107 fills calibration tube 103a, so that the chamber 101b is loaded to a predetermined value, namely the pressure head 104. Operation can be performed, for instance, by a switch drum 120 operating the various switches via connections 105a – 109a. In the second calibration position the distributing switch 109 is closed. The output signal of the subtractor 114 is then the calibration signal, corrected for "0," associated with a loading of the pressure pick-up 101 by a column 104. The associated reference signal is stored in store 115 which, by division by the corrected calibration signal, delivers the fault signal stored in store 117 which supplies the fault signal to divider 118 until the next calibration. The distributing switch 109 can then be re-opened until the next calibration. In this case also store 117 is emptied simultaneously with the closure of the switch 109.

During measurement, the incoming measuring signal S to be determined has the following inaccuracies: $a$: the "0" deviation, and R: the sensitivity deviation: $S' = a + RS$. At 114 $a$ is removed from this signal by subtraction thus leaving $RS$. $R$ is also known by comparison and calibration. In 118 the remaining signal $RS$ is divided by $R$, leaving only $S$ in the processing and reading instrument 119.

Figure 4:
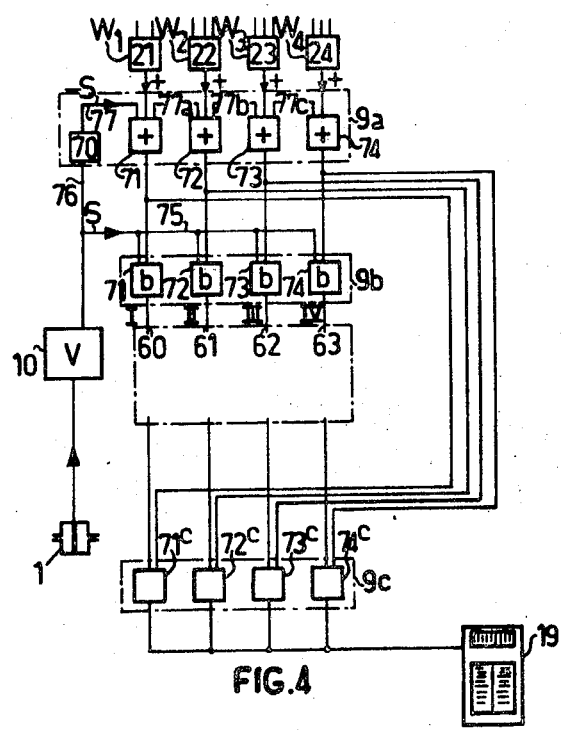
FIG. 4 shows an example of a selector switch from the circuit illustrated in FIG. 1.

The embodiment of a selector switch 9 illustrated in FIG. 4 comprises switch mechanisms disposed in blocks 9a – 9c (corresponding to the blocks shown in FIG. 1). An amplified signal S passes via connections 75, 76 to the blocks 9a, 9b. In block 9a the signal $S$ is introduced at polarity changeover unit 70, which converts the positive measuring signal $S$ into a negative signal $-S$ of identical value. The calibration signals $W_1 - W_4$ are transferred from stores 21 – 24 to adders 71 – 74. Incorporated in each of the adders 71 – 74 is a switch which, when a zero voltage or a positive voltage is reached, sends a control signal to the associated switches 71b – 74b; 71c – 74c, and when a negative voltage is reached makes a connection to the following adders 72 – 74. This can be very simply performed by means of electronic tubes or transistors (not shown). A negative signal $S$, which belongs in the third measuring range in view of its voltage, therefore has a voltage higher than $W_2$, but lower than $W_3$. Since 71 delivers a control signal only when a zero voltage or positive voltage has been reached, the connection 77 is connected and then passes via 77a to 72. The result of this addition is also negative — i.e., in this case also the connection 77a is connected to connection 77b and the control signal therefore passes via 77b to 73. Then, however, the result of the addition is positive, the flip-flop control circuit is changed over, the connection 77 not being connected, and a control signal is delivered to switches 73b, 73c (which are normally open) so that they are then closed. The measuring signal $S$ then enters corrector $C_{III}$ via line 62.

Figure 5:
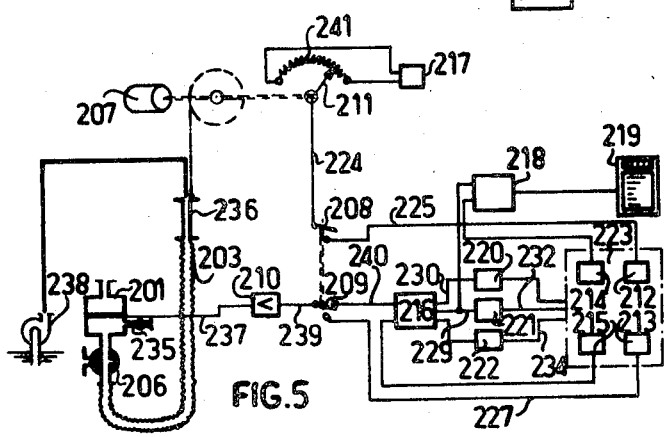
FIG. 5 is a diagram showing an apparatus for the performance of a further developed method according to the invention.

FIG. 5 shows a calibration method in which the whole measuring range is gradually covered during calibration.

To this end, in the embodiment illustrated, pressure pick-up 201 can if desired be calibrated in the unpressurized position by placing top edge 236 of a flexible tube 203 below the pressure pick-up 201. When valve 235 is opened the two chambers of the pressure pick-up 201 are connected to atmospheric pressure and the output signal is the "0" signal. The top edge 236 is then moved into the initial calibration position and the venting valve 235 is closed as soon as the water delivered by pump 238 emerges, the top edge 236 of the flexible tube 203 being in a precisely identical position to that of the diaphragm of the pressure pick-up 201, which therefore as yet delivers no output signal.

For calibration the switches 208, 209 are connected in the lowest position. An output signal delivered by the pressure pick-up 201 passes via connection 237, amplifier 210, connection 239, switch 209 and connection 227 to a record head 213 associated with one track of a two-track recorder 223, taking the form of a photographic, electrostatic or similar d.c. recorder.

At the same time in this calibration position a constant current source 217 delivers to a slider 211 via a calibrated resistor 241 a voltage which passes via connection 224, switch 208 and connection 225 to record head 212 of the other track of the two-track recorder 223. Since the lifting of the top edge 236 by a motor 207, mechanically connected to the slider 211 of the calibrated potentiometer 241, produces a linear reference signal, a linear signal is also recorded on the two-track tape or recording store in the recorder.

For measurement the switches 208, 209 are placed in the top position and the three-way valve 206 is placed in the measuring position. An amplified output signal then passes via connection 240 to a subtractor 216 which subtracts such signal from the signal read by reading head 215. If the signal is positive it passes via connection 230 to a command unit 220 which delivers a signal for the rotation of the pick-up motor. If the signal is negative, the command unit 222 and connection 234 drive the pick-up motor in the opposite direction. As soon as an "0" voltage has been reached the motor is stopped by a signal from the command unit 221 via connection 232, and at the same time via connection 229 a switch 218 is changed over which connects the signal of the read-out head 214 for the reference signal to recorder 219.

What I claim is:

1. A method of controlling a process, in which at least one pick-up, with an electric output signal is used, after amplification by means of an amplifier, for the control of the process, comprising performing a measuring cycle comprising at least one measurement preceded by at least two calibrations, during which calibrations the pick-up is subjected to different calibration states to produce initial calibration signals, and during which measurement the pick-up is subjected to a measuring state to produce a measuring signal, and obtaining the reference signal ($S'''_{III}$) relating to the measurement by producing the signal difference ($S_{III}-W_2$) between the measuring signal ($S_{III}$) and the one calibration signal ($W_2$) of the one of the two calibrations, multiplying the signal difference ($S_{III}-W_2$) by the reference signal difference ($Y_3-Y_2$) associated with the state difference ($P_3-P_2$), dividing the reference signal difference by the calibration signal difference ($W_3-W_2$) of the two calibrations, and algebraically adding the result to the one reference calibration signal ($Y_2$) associated with the one calibration state ($P_2$).

2. An apparatus for controlling a process,
said apparatus having measuring means comprising at least one pick-up, one electric output of which is connected to an amplifier having its output connected to a device for controlling the process and comprising calibration means for loading the pick-up in the calibration state, comprising:
calibration means which can load the pick-up in at least two different calibration states;
recording means for recording and reproducing during measurement the amplified initial calibration signals of the pick-up;
a subtractor for producing the signal difference ($S_{III}-W_2$) between the one calibration signal ($W_2$) of the two calibrations and the measuring signal ($S_{III}$);

calculating means for calculating the value $(S_{III}-W_2)(Y_3-Y_2)/(W_3-W_2)$ being the product of the signal difference $(S_{III}-W_2)$ and the reference signal difference $(Y_3-Y_2)$ associated with the state difference $(P_3-P_2)$, said product being divided by the calibration signal difference $(W_3-W_2)$ of the two calibrations;

and an adder for algebraically adding the output signal of said calculating means to the one reference calibration signal $(Y_2)$ associated with the one calibration state $(P_2)$, the adder output being connected to the input of said device.

3. A method of controlling with a signal-producing instrumentality a process which is required to be controlled with respect to a variable over a range of values of the variable between the end values $P_{n-1}$ and $P_n$ and which process is controlled correctly over said range by control signals which vary linearly over said range and have the known values $Y_{n-1}$ and $Y_n$ for the respective end values $P_{n-1}$ and $P_n$ of the variable and a known slope between such known values, said signal-producing instrumentality having an output over said range in response to variations in said variable which is essentially linear but is of a slope different from said known slope, which comprises the steps of:
   a. measuring said variable with said instrumentality and storing the output of the instrumentality at said value $P_{n-1}$ of the variable to yield a calibration signal $W_{n-1}$;
   b. measuring said variable with said instrumentality and storing the output of said instrumentality at said value $P_n$ of the variable to yield a calibration signal $W_n$; and thereafter
   c. measuring said variable within said range thereof with said instrumentality to produce an output $S_n$; and
   d. correcting said output $S_n$ to yield a control signal equal to $(S_n-W_{n-1})[(Y_n-Y_{n-1})/(W_n-W_{n-1})]+Y_{n-1}$.

4. A method of controlling a process as defined in claim 3 including the steps of:
   a. measuring said variable with said instrumentality and storing the output of said instrumentality at a further value $P_{n-2}$ of the variable to yield a calibration signal $W_{n-2}$;
   b. measuring said variable with said instrumentality and storing the output of said instrumentality at a still further value $P_{n-3}$ of the variable to yield a calibration signal $W_{n-3}$, said values $P_{n-2}$ and $P_{n-3}$ being end values of a further range in which the process is controlled correctly by control signals which vary linearly over such further range and have known values $Y_{n-2}$ and $Y_{n-3}$ for the respective end values $P_{n-2}$ and $P_{n-3}$; and thereafter
   c. measuring said variable within said further range thereof with said instrumentality to produce an output $S^1_n$; and
   d. correcting said output $S^1_n$ to yield a control signal equal to $(S^1_n-W_{n-2})[(Y_{n-3}-Y_{n-2})/(W_{n-3}-W_{n-2})]+Y_{n-2}$.

5. A method of controlling a process as defined in claim 3 including the steps of:
   a. measuring said variable with said instrumentality and storing the output of said instrumentality at a further value $P_{n-2}$ of the variable to yield a calibration signal $W_{n-2}$, said values $P_{n-1}$ and $P_{n-2}$ being end values of a further range in which the process is controlled correctly by control signals which vary linearly over such further range and have the known values $Y_{n-1}$ and $Y_{n-2}$ for the respective end values $P_{n-1}$ and $P_{n-2}$; and thereafter
   b. measuring said variable with said instrumentality and storing the output $S^1_n$; and
   c. correcting said output $S^1_n$ to yield a control signal equal to $(S^1_n-W_{n-1})[(Y_{n-2}-Y_{n-1})/(W_{n-2}-W_{n-1})]+Y_{n-1}$.

6. A method of controlling a process which is required to be controlled linearly with respect to a variable $P$ over a range of values of the variable by means of an instrumentality which produces an output $S$ in response to said variable which is non-linear over at least a portion of said range and which yields outputs for discrete values of said variable which differ from those corresponding values of an ideal control signal $Y$ which are required for correct control of the process, which comprises the steps of:
   a. measuring said variable with said instrumentality for different values $P_0, P_1 ---P_n$ of said variable and storing the corresponding output values $W_0, W_1 ---W_n$ of said instrumentality, said values $P_0, P_1 ---P_n$ being selected sufficiently close such that the outputs of said instrumentality within the small ranges between pairs of successive values $W_0, W_1 ---W_n$ are essentially linear; and thereafter
   b. measuring said variable with said instrumentality to produce a process control output $S$; and
   c. correcting the process control output of step (b) to yield a control signal equal to $(S-W_{i-1})[(Y_i-Y_{i-1})/(W_i-W_{i-1})]+Y_{i-1}$ where $W_i$ and $W_{i-1}$ represent that pair of values $W_0, W_1 ---W_n$ between which the process control output $S$ of the instrumentality falls and $Y_i$ and $Y_{i-1}$ are corresponding values of the ideal control signal.

* * * * *